(12) United States Patent
Nagai et al.

(10) Patent No.: US 10,511,217 B2
(45) Date of Patent: Dec. 17, 2019

(54) MAGNETIC CLUTCH DEVICE

(71) Applicant: Toyota Jidosha Kabushiki Kaisha, Toyota-shi (JP)

(72) Inventors: Hidekazu Nagai, Susono (JP); Hiroyuki Shioiri, Yokohama (JP); Takashi Ohta, Yamato (JP); Yoshihiro Mizuno, Nagakute (JP); Eiji Tsuchiya, Nagakute (JP); Norio Yonezawa, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 30 days.

(21) Appl. No.: 15/945,845

(22) Filed: Apr. 5, 2018

(65) Prior Publication Data
US 2018/0294707 A1    Oct. 11, 2018

(30) Foreign Application Priority Data

Apr. 7, 2017 (JP) .................................. 2017-076385

(51) Int. Cl.
*H02K 7/00* (2006.01)
*H02K 49/10* (2006.01)
*F16D 27/00* (2006.01)

(52) U.S. Cl.
CPC .......... *H02K 49/106* (2013.01); *F16D 27/00* (2013.01); *H02K 7/006* (2013.01); *Y02T 10/641* (2013.01)

(58) Field of Classification Search
CPC ...... H02K 49/106; H02K 7/006; F16D 67/00; F16D 67/06; F16D 27/00
USPC ............................................................ 310/78
See application file for complete search history.

(56) References Cited

U.S. PATENT DOCUMENTS

| 4,949,828 | A | * | 8/1990 | Olsen | ............ F16D 27/112 192/150 |
|---|---|---|---|---|---|
| 5,739,605 | A | * | 4/1998 | Lazorchak | ............ F16D 27/004 192/113.25 |
| 6,165,095 | A | * | 12/2000 | Till | ............ F16D 27/11 192/84.2 |
| 2011/0248588 | A1 | * | 10/2011 | Dimig | ............ H01F 7/04 310/93 |

FOREIGN PATENT DOCUMENTS

JP            01-303331        12/1989

* cited by examiner

*Primary Examiner* — Terrence L Kenerly
(74) *Attorney, Agent, or Firm* — Oblon, McClelland, Maier & Neustadt, L.L.P.

(57) ABSTRACT

A magnetic clutch device having improved durability and reliability without increasing a size in an axial direction. A fixed member, the first engagement element, and a second engagement element are arranged concentrically to one another in order from a rotational center axis. The first engagement element comprises a first magnet. The fixed member comprises a second magnet in which a polarity is switched between a straight polarity and a reversed polarity, and a coil that switches the polarity of the second magnet depending on a direction of the current applied thereto.

8 Claims, 5 Drawing Sheets

Fig. 4

MAGNETIC CLUTCH DEVICE

CROSS REFERENCE TO RELATED APPLICATIONS

The present invention claims the benefit of priority to Japanese Patent Application No. 2017-076385 filed on Apr. 7, 2017 with the Japanese Patent Office, the entire contents of which are incorporated herein by reference in its entirety.

BACKGROUND

Field of the Invention

Embodiment of the present disclosure relates to the art of a magnetic clutch device adapted to selectively transmit torque between rotary members by selectively establishing a magnetic circuit between the rotary members.

Discussion of the Related Art

An example of an electromagnetic brake that transmits torque by a magnetic force is described in JP-A-H01-303331. In the electromagnetic brake taught by JP-A-H01-303331, a rotary member and a fixed member are arranged coaxially while being opposed to each other. An armature is provided on the rotary member, and a yoke is provided on the fixed member. The yoke is provided with a first permanent magnet, a coil, and a second permanent magnet whose magnetic pole is inverted according to a direction of a pulse current flowing through the coil. When setting magnetic poles of the second permanent magnet in such a manner as to form a forward magnetic circuit in the yoke by the first permanent magnet, the magnetic circuit is closed in the yoke. In this situation, the magnetic circuit is not formed between the yoke and the armature. That is, torque does not act between the fixed member and the rotary member. Consequently, the electromagnetic brake is released. When the pulse current is supplied to the coil, magnetic poles of the second permanent magnet are inverted so that the magnetic circuit is formed between the yoke and the armature. Consequently, the fixed member and the rotary member are magnetically attracted to each other. That is, the electromagnetic brake is engaged.

Thus, the electromagnetic brake described in JP-A-H01-303331 is configured so as to selectively exert the torque between the fixed member and the rotary member without bringing those members into contact to each other. For this reason, the electromagnetic brake described in JP-A-H01-303331 may be used as a clutch to selectively connect two rotary members. However, in the electromagnetic brake described in JP-A-H01-303331, the permanent magnet and the coil are arranged in one of the rotary members. That is, if the electromagnetic brake described in JP-A-H01-303331 is used as the clutch, the coil is rotated together with one of the rotary member. In this case, a slip ring is used to supply electricity to the coil by bringing a carbon brush or a wire brush into contact to the ring. However, the slip ring would be frictionally worn thereby reducing a torque capacity of the clutch. For this reason, it is difficult to use the electromagnetic brake described in JP-A-H01-303331 as a clutch in a vehicular powertrain.

Further, in the electromagnetic brake described in JP-A-H01-303331, the rotary member and the fixed member are arranged coaxially while being opposed to each other. That is, the electromagnetic brake described in JP-A-H01-303331 is axially too large to be fitted the powertrain. In addition, is the electromagnetic brake described in JP-A-H01-303331 is used in the powertrain, areas of engagement surfaces are insufficient to ensure an engagement force.

SUMMARY

Aspects of preferred embodiments of the present application have been conceived noting the foregoing technical problems, and it is therefore an object of the present application is to provide a magnetic clutch device having improved durability and reliability without increasing a size in an axial direction.

The embodiment of the present disclosure relates to a magnetic clutch device that engages a first engagement element and a second engagement element with each other to transmit torque by establishing a magnetic circuit between the first engagement element and the second engagement element, and that disengages the first engagement element and the second engagement element from each other to interrupt torque transmission by eliminating the magnetic circuit between the first engagement element and the second engagement element. In order to achieve the above-explained objective, according to the embodiment of the present disclosure, the first engagement element and the second engagement element are arranged concentrically to each other. A fixed member that is not allowed to rotate is arranged in a radially inner side or radially outer side of the first engagement element and the second engagement element while being concentrically to the first engagement element and the second engagement element. The first engagement element includes a first magnet. The fixed member includes a second magnet in which a polarity is switched between a straight polarity and a reversed polarity in accordance with a direction of the magnetic circuit established by the first magnet between the first engagement element and the second engagement element, and a coil that switches the polarity of the second magnet depending on a direction of the current applied thereto. The second engagement element is situated in a radially opposite side of the fixed member across the first engagement element, and the second engagement element is formed of a magnetic body through which the magnetic circuit penetrates. The magnetic circuit circulating between the first engagement element and the second engagement element is eliminated when the polarity of the second magnet is set in the straight polarity.

In a non-limiting embodiment, the magnetic circuit circulating between the first engagement element and the second engagement element may be eliminated by the second magnet to disengage the first engagement element and the second engagement element from each other. The magnetic circuit may be established between the first engagement element and the second engagement element by the second magnet to magnetically attract the first engagement element and the second engagement element to each other.

In a non-limiting embodiment, the fixed member may be situated in the radially inner side of the first engagement element and the second engagement element.

In a non-limiting embodiment, the first engagement element may include an engagement face, the second engagement element may include an engagement face, and the first engagement element and the second engagement element may be magnetically engaged with each other while maintaining a gap between the engagement face of the first engagement element and the engagement face of the second engagement element.

In a non-limiting embodiment, a plurality of protrusions may be formed on the engagement face of the first engagement element in such a manner as to protrude toward the engagement face of the second engagement element. A plurality of protrusions may also be formed on the engagement face of the second engagement element in such a manner as to protrude toward the engagement face of the first engagement element.

In a non-limiting embodiment, the first engagement element may include a first segment and a second segment being opposed to each other in an axial direction. The first magnet may be interposed between the first segment and the second segment. The first engagement element may further include a stopper portion formed on a radially outer portion of each of the first segment and the second segment.

In a non-limiting embodiment, the magnetic clutch device may be arranged in a powertrain of a vehicle. In this case, the fixed member may be fixed to a stationary member, the first engagement element may be connected to a first disc member, the second rotary member may be connected to a second disc member, the first disc member may be connected to a rotary shaft of a first rotary element of a differential mechanism, and the second disc member may be connected to a rotor shaft of a first motor.

In a non-limiting embodiment, the differential mechanism may include the first rotary element, a second rotary element, and a third rotary element. The first rotary element may be connected to the first motor by engaging the first engagement element and the second engagement element, the second rotary element may be connected to an engine, and the third rotary element may be connected to an output member that delivers a drive force to a drive wheel. The vehicle may comprise a second motor connected to a power transmission route between the drive wheel and the third rotary element. The second motor may be driven by an electric power generated by the first motor to generate a drive force to be delivered to the drive wheel.

Thus, the magnet clutch device according to the embodiment of the present disclosure comprises a fixed member that is not allowed to rotate, a first engagement element having the first magnet that is adjacent to the fixed member, and a second engagement element that transmits torque to/from the first engagement element without being contacted to the first engagement element. The fixed member, the first engagement element, and the second engagement element are arranged concentrically to one another. The fixed member comprises the second magnet that switches a direction of the magnetic circuit established between the first engagement element and the second engagement element, and a coil that switches the polarity of the second magnet when a current is applied thereto. Specifically, the polarity of the second magnet is reversed by supplying a current to the fixed member to transmit torque between the first engagement element and the second engagement element. That is, in the magnet clutch device according to the embodiment it is unnecessary to arrange an additional movable member such as a slip ring to supply current to one of the first engagement element and the second engagement. According to the embodiment, therefore, the magnetic clutch device will not be damaged frictionally and hence reliability of the magnetic clutch device can be improved to be used in a powertrain of automobiles.

In addition, since the fixed member, the first engagement element, and the second engagement element are arranged concentrically to one another, a size of the magnetic clutch device in the axial direction can be reduced. According to the embodiment, therefore, the magnetic clutch device may be can be fitted easily into the powertrain of automobiles without increasing a size of the powertrain.

Further, since the second engagement element is situated in the radially opposite side of the fixed member across the first engagement element, a circumferential area of the engagement face of each of the first engagement element and the second engagement element can be increased respectively. According to the embodiment, therefore, a torque transmitting capacity of the magnetic clutch device can be increased to improve the reliability of the magnetic clutch device.

BRIEF DESCRIPTION OF THE DRAWINGS

Features, aspects, and advantages of exemplary embodiments of the present invention will become better understood with reference to the following description and accompanying drawings, which should not limit the invention in any way.

FIGS. 5A and 5B are schematic illustrations showing a magnetic field in the magnetic clutch device, in which FIG. 5A shows the magnetic clutch device in disengagement, and FIG. 5B shows the magnetic clutch device in engagement.

DETAILED DESCRIPTION OF THE PREFERRED EMBODIMENT(S)

Figure 1:
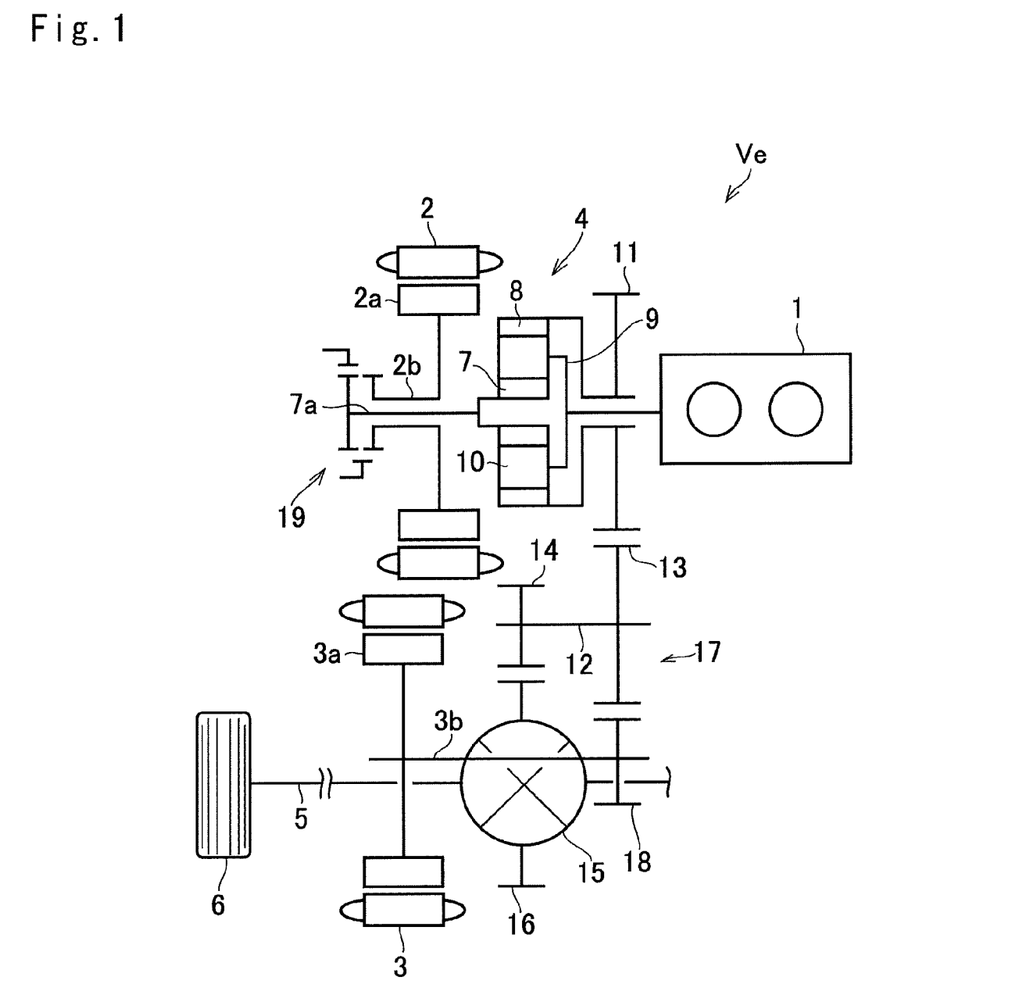
FIG. 1 is a schematic illustration showing a powertrain of a vehicle to which the magnetic clutch device according to the embodiment of the present disclosure is applied.

Embodiment of the present disclosure will now be explained with reference to the accompanying drawings. Referring now to FIG. 1, there is shown an example of a powertrain of a vehicle Ve using a magnetic clutch device according to the embodiment. A prime mover of the vehicle Ve includes an engine 1 as a main prime mover, a first motor 2, and a second motor 3. An output power of the engine 1 is distributed to the first motor 2 and to a driveshaft 5 through a power split mechanism 4 as a differential mechanism. An electric power generated by the first motor 2 may be supplied to the second motor 3 to generate torque, and output torque of the second motor 3 may be delivered to drive wheels 6 through the driveshaft 5.

The engine 1 is a conventional internal combustion engine such as a gasoline engine and a diesel engine. Each of the first motor 2 and the second motor 3 is a motor-generator that is operated not only as a motor to generate torque by applying electricity thereto, but also as a generator to generate electricity by applying torque thereto. For example, a permanent magnet synchronous motor and an AC motor such as an induction motor may be used individually as the first motor 2 and the second motor 3. The first motor 2 and the second motor 3 are connected to a storage device such as a battery and a capacitor through an inverter (neither of which are shown) so that electric power may be supplied to the first motor 2 and the second motor 3 from the storage device. The storage device may also be charged with electric powers generated by the first motor 2 and the second motor 3.

The power split mechanism 4 as a single-pinion planetary gear unit is connected to an output shaft of the engine 1 to distribute output power of the engine 1 to the first motor 2 and to the drive wheels 6. The power split mechanism 4 comprises a sun gear 7 as a first rotary element, a ring gear 8 as a third rotary element arranged concentrically with the sun gear 7, a plurality of pinion gears 10 interposed between the sun gear 7 and the ring gear 8, and a carrier 9 as a second rotary element supporting the pinion gears 10 in a rotatable manner.

In the power split mechanism 4, the carrier 9 is connected to the output shaft of the engine 1. That is, the output shaft of the engine 1 also serves as an input shaft of the power split mechanism 4.

The first motor 2 is disposed in an opposite side of the engine 1 across the power split mechanism 4, and in the first motor 2, a rotor shaft 2b that is rotated integrally with a rotor 2a is connected to the sun gear 7 of the power split mechanism 4 through an after-mentioned engagement device.

A first drive gear 11 as an external gear is formed integrally with the ring gear 8 of the power split mechanism 4 to serve as an output member, and a countershaft 12 is arranged in parallel with a common rotational axis of the power split mechanism 4 and the first motor 2. A counter driven gear 13 is fitted onto one end of the countershaft 12 (i.e., right side in FIG. 1) to be rotated integrally therewith while being meshed with the first drive gear 11, and a counter drive gear (i.e., a final drive gear) 14 is fitted onto the other end of the countershaft 12 (i.e., left side in FIG. 1) in such a manner as to be rotated therewith while being meshed with a differential ring gear (i.e., a final driven gear) 16 of a differential gear unit 15 as a final reduction. Thus, the ring gear 8 of the power split mechanism 4 is connected to the driveshaft 5 and the drive wheels 6 through the first drive gear 11, the countershaft 12, the counter driven gear 13, the counter drive gear 14, and an output gear train 17 including the differential ring gear 16.

In the powertrain of the vehicle Ve, an output torque of the second motor 3 can be added to the torque delivered from the power split mechanism 4 to the drive wheels 6 through the driveshaft 5. To this end, a rotor 3a of the second motor 3 is connected to a rotor shaft 3b extending in parallel with the countershaft 12 to rotate integrally therewith, and a second drive gear 18 is fitted onto a leading end of the rotor shaft 3b to be rotated integrally therewith while being meshed with the counter driven gear 13. Thus, the ring gear 8 of the power split mechanism 4 and the second motor 3 are individually connected to the drive wheels 6 through the second drive gear 18, the output gear train 17, and the driveshaft 5.

In order to selectively connect a rotary shaft 7a of the sun gear 7 to the rotor shaft 2b, a clutch device 19 is arranged in the powertrain of the vehicle Ve. According to the embodiment, a magnetic clutch in which an engagement state is switched by energizing a coil is used as the clutch device 19. Specifically, the rotary shaft 7a of the sun gear 7 and the rotor shaft 2b are connected to each other to rotate integrally by engaging the clutch device 19. In FIG. 1, an upper half of the clutch device 19 indicates disengagement of clutch device 19, and a lower half of the clutch device 19 indicates engagement of the clutch device 19.

Here will be explained a principle for activation of the clutch device 19. In the clutch device 19, polarity of one of magnets is reversed by applying current to a coil wound around the magnet. Consequently, magnetic attraction is established so that the engagement elements are engaged to each other. That is, the clutch device 19 may also be called a variable field engagement device. In the clutch device 19, rotary members are engaged to each other while keeping an air gap 20, that is, without being contacted to each other.

Thus, the clutch device 19 may be activated without requiring hydraulic pressure, and may be maintained in engagement without supplying current thereto. In addition, since the engagement elements are engaged while maintaining a clearance therebetween, the clutch device 19 may be prevented from being frictionally damaged without requiring lubrication.

Figure 2:
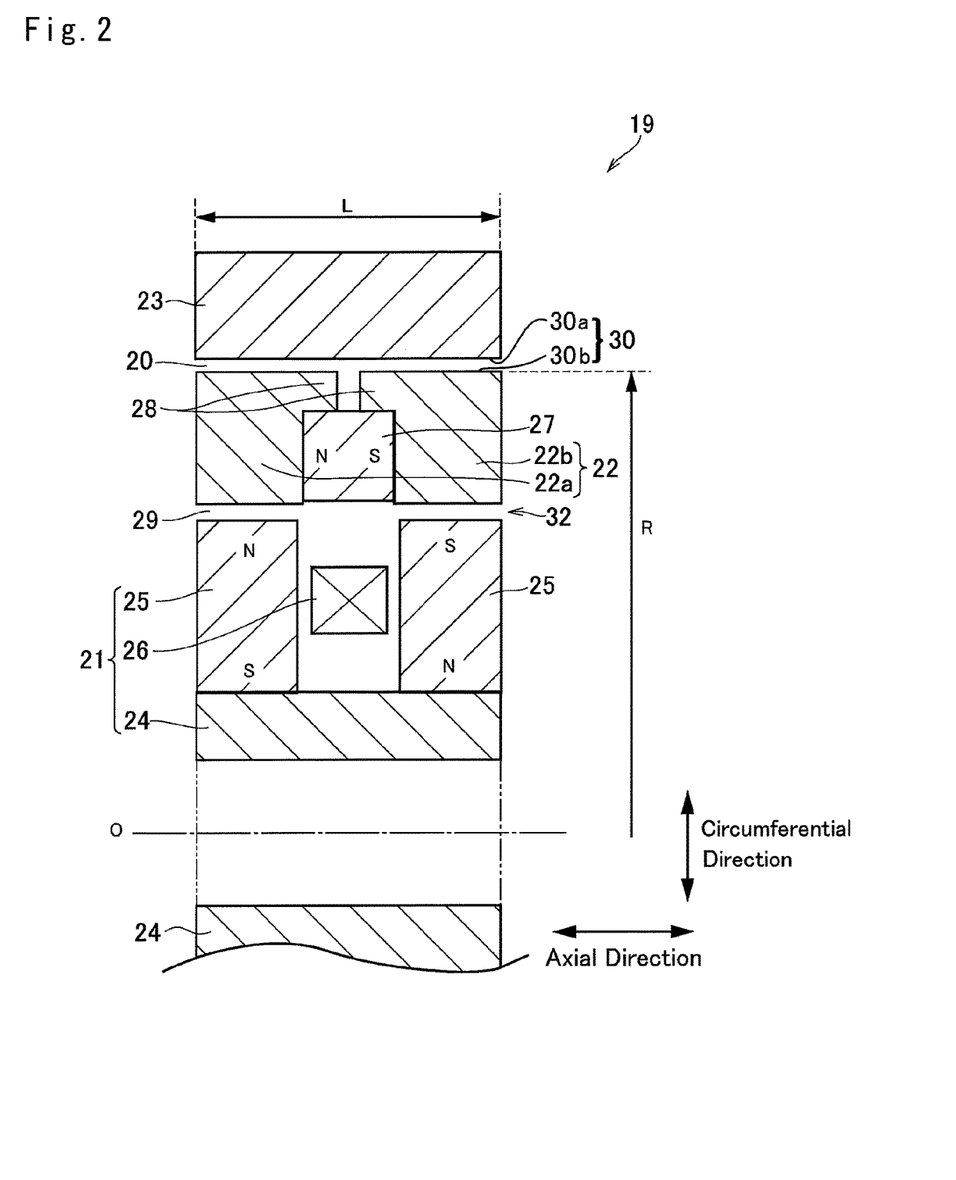
FIG. 2 is cross-sectional view showing a structure of the magnetic clutch device according to the embodiment.

Structure of the clutch device 19 is illustrated in FIG. 2 in more detail. The clutch device 19 comprises a fixed member 21, a first rotary member 22 as a first engagement element, and a second rotary member 23 as a second engagement element. In the clutch device 19, the first rotary member 22 and the second rotary member 23 are selectively rotated integrally with each other and relatively to each other. To this end, a magnetic field is selectively established between the first rotary member 22 and the second rotary member 23 to selectively transmit torque between the first rotary member 22 and the second rotary member 23. Specifically, the fixed member 21, the first rotary member 22, and the second rotary member 23 are arranged concentrically to one another in order from a rotational center axis O.

The fixed member 21 as an innermost member of the clutch device 19 comprises a cylindrical member 24, a pair of permanent magnets 25, and a coil 26 interposed between the magnets 25 to establish a magnetic field. For example, an alnico magnet may be used as individually as each of the magnets 25, and polarity of each of the magnets 25 is individually reversed by energizing the coil 26. That is, the North pole and the South pole the magnet 25 is switched by energizing the coil 26. Accordingly, each of the magnets 25 will be respectively called the "reversible magnet" hereinafter. In other words, the polarity of the reversible magnet 25 is switched between a straight polarity and a reversed polarity in accordance with a direction of the magnetic field established by another magnet 27 between the first rotary member 22 and the second rotary member 23. For example, a neodymium magnet which can establish a stronger magnetic force and in which polarity cannot be reversed may be used as the magnet 27, and accordingly the magnet 27 will be called the "non-reversible magnet" hereinafter. Specifically, the polarity of the reversible magnet 25 is switched by switching a direction of the current supplied to the coil 26. Alternatively, the fixed member 21 may also be arranged in radially outer side of the first rotary member 22 and the second rotary member 23.

The first rotary member 22 is also a cylindrical member, and situated in radially outer side of the fixed member 21. The first rotary member 22 is divided into a first segment 22a and a second segment 22b being opposed to each other in the axial direction, and the non-reversible magnet 27 is interposed between the first segment 22a and the second segment 22b. The non-reversible magnet 27 is subjected to a centrifugal force resulting from rotation of the first rotary member 22. In order to hold the non-reversible magnet 27 between the first segment 22a and the second segment 22b of the first rotary member 22, a stopper portion 28 is formed respectively on a radially outer portion of each of the first segment 22a and the second segment 22b in such a manner as to reduce a clearance between the first segment 22a and the second segment 22b. In the embodiment, accordingly, the non-reversible magnet 27 serves as a "first magnet", and the reversible magnet 25 serves as a "second magnet".

An air gap 29 is maintained between the fixed member 21 and the first rotary member 22, and a magnetic attraction acts between the fixed member 21 and the first rotary member 22. That is, in the clutch device 19, the first rotary member 22 is engaged with the fixed member 21 while keeping the air gap 29, that is, without being contacted to the fixed member 21. Here, when the clutch device 19 is in disengagement, the fixed member 21 and the first rotary member 22 may serve as a brake mechanism.

The second rotary member 23 is also a cylindrical member, and the second rotary member 23 is situated in radially outer side of the first rotary member 22. As describes, the air gap 20 is also maintained between the first rotary member 22 and the second rotary member 23. Specifically, the air gap 20 is maintained between an outer circumferential face 30a as an engagement face of the first rotary member 22 and an inner circumferential face 30b as an engagement face of the second rotary member 23. Both of the first rotary member 22 and the second rotary member 23 are formed of magnetic material or magnetic body at least partially so that the magnetic flux created by the non-reversible magnet 27 penetrates through the outer circumferential face 30a of the first rotary member 22 and the inner circumferential face 30b of the second rotary member 23. A direction of the magnetic flux is switched by supplying current to the coil 26 so that a closed magnetic circuit is established between the first rotary member 22 and the second rotary member 23 thereby attracting the first rotary member 22 and the second rotary member 23 to each other. Thus, in the embodiment, the outer circumferential face 30a and the inner circumferential face 30b serve as an engagement portion 30.

As described, the first rotary member 22 is engaged with the fixed member 21 while keeping the air gap 29, and with the second rotary member 23 while keeping the air gap 20. Each of the air gaps 20 and 29 are individually set as narrow as possible to increase magnetic density thereby generating strong magnetic force. As also described, according to the embodiment, the fixed member 21 and the second rotary member 23 are situated radially outer side, and hence the air gap 20 between the fixed member 21 and the second rotary member 23 is also situated radially outer side. That is, a radial distance R between the rotational center axis O and the air gap 20 is increased. For this reason, a circumferential area S of each of the outer circumferential face 30a of the first rotary member 22 and the inner circumferential face 30b of the second rotary member 23 can be increased respectively. In other words, the circumferential area S of the engagement portion 30 can be increased. The circumferential area S can be expressed by the following expression:

$$S = 2\pi R \cdot L;$$

where L is an axial length of the air gap 20.

Thus, the circumferential area S of the engagement portion 30 is changed depending on the radial distance R, and a torque transmitting capacity of the clutch device 19 is changed depending on the circumferential area S. In addition, the torque transmitting capacity of the clutch device 19 may also be changed by altering arrangements of the reversible magnet 25 and the non-reversible magnet 27. To this end, for example, a plurality of the reversible magnet 25 and the non-reversible magnet 27 may be arranged in the circumferential direction (i.e., a rotational direction) while keeping predetermined intervals. In addition, numbers and arrangements of the reversible magnet 25 and the non-reversible magnet 27 may be altered depending on a desired torque transmitting capacity of the clutch device 19.

Figure 3:
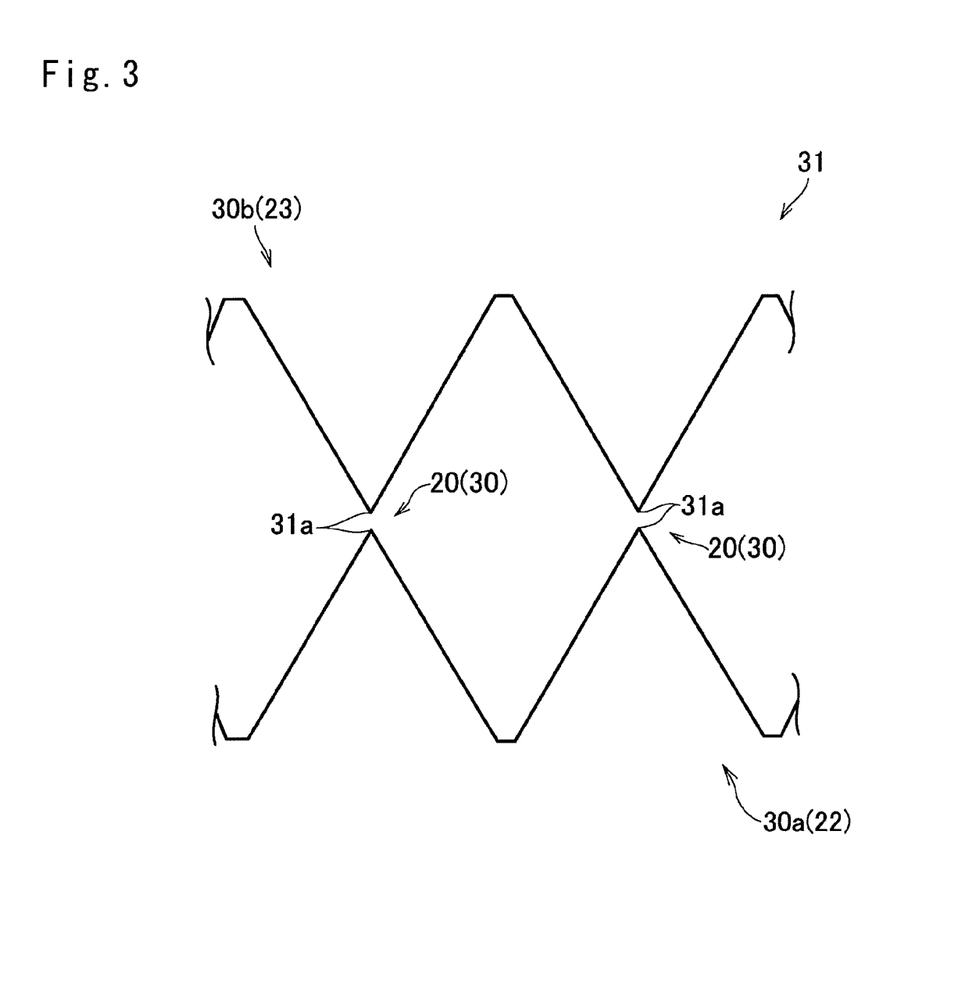
FIG. 3 is a schematic illustration showing a salient pole structure of the magnetic clutch device shown in FIG. 2.

As depicted in FIG. 3, the outer circumferential face 30a of the first rotary member 22 and the inner circumferential face 30b of the second rotary member 23 form a salient pole structure 31. Specifically, a plurality of protrusions 31a individually having a triangle cross-section are formed on the outer circumferential face 30a of the first rotary member 22 and the inner circumferential face 30b of the second rotary member 23. In the outer circumferential face 30a of the first rotary member 22, each of the protrusions 31a is tapered toward the inner circumferential face 30b of the second rotary member 23. On the other hand, in the inner circumferential face 30b of the second rotary member 23, each of the protrusions 31a is tapered toward the outer circumferential face 30a of the first rotary member 22. In other words, the air gap 20 is narrowed by the protrusions 31a. In the clutch device 19, therefore, the magnetic attraction acting between the outer circumferential face 30a and the inner circumferential face 30b is enhanced by the salient pole structure 31 to firmly engage the first rotary member 22 with the second rotary member 23.

Here, shape of the protrusion 31a may be altered e.g., to have a truncated trapezoidal cross-section. Optionally, the salient pole structure 31 may also be applied to the air gap 29 between the fixed member 21 and the first rotary member 22.

Figure 4:
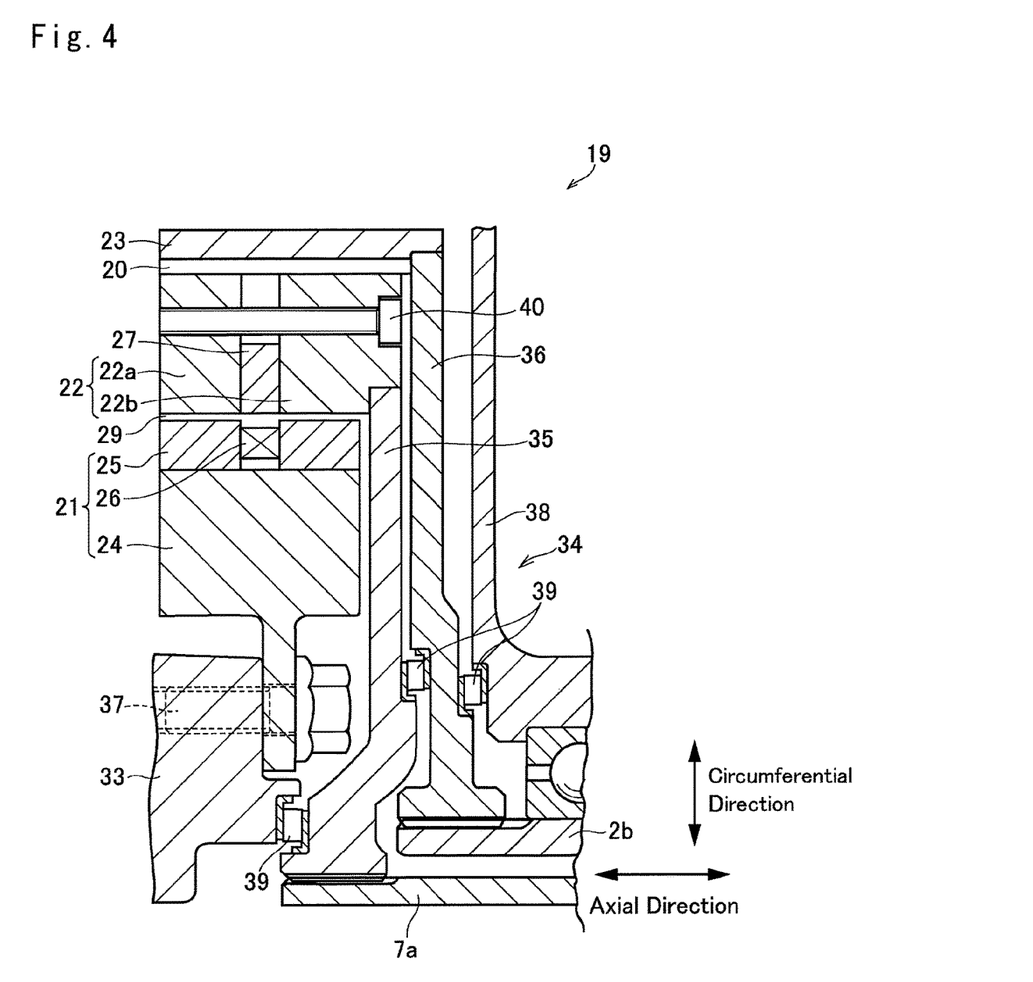
FIG. 4 is a cross-sectional view showing the magnetic clutch device shown in FIG. 2 applied to the powertrain shown in FIG. 1.

FIG. 4 shows an example to apply the clutch device 19 to the powertrain shown in FIG. 1. In the example shown in FIG. 4, the clutch device 19 is arranged between the casing 33 as a stationary member and the housing 34 to selectively engage the rotary shaft 7a of the sun gear 7 with the rotor shaft 2b. As described, the fixed member 21, the first rotary member 22, and the second rotary member 23 are arranged concentrically to one another in order from the rotational center axis. In the fixed member 21, the coil 26 is interposed between the pair of reversible magnets 25, and in the first rotary member 22, the non-reversible magnet 27 is interposed between the first segment 22a and the second segment 22b.

Specifically, the fixed member 21 is fixed to the casing 33 by a fixing member 37 such as a bolt. The rotary shaft 7a of the sun gear 7 is spliced into a center hole of a first disc member 35, and a circumferential edge of the first disc member 35 is attached to the first rotary member 22. The rotor shaft 2b is spliced into a center hole of a second disc member 36, and a circumferential edge of the second disc member 36 is attached to the second rotary member 23. When the clutch device 19 is in engagement, the first rotary member 22 and the second rotary member 23 are rotated integrally with each other so that the rotary shaft 7a of the sun gear 7 and the rotor shaft 2b are rotated integrally with each other. By contrast, when the clutch device 19 is in disengagement, the first rotary member 22 and the second rotary member 23 are rotated relatively to each other so that the rotary shaft 7a of the sun gear 7 and the rotor shaft 2b are rotated relatively to each other.

In order to receive an axial load, a thrust bearing 39 is interposed individually between the first disc member 35 and the casing 33, between the first disc member 35 and the second disc member 36, and between the second disc member 36 and a rib 38 formed integrally with the housing 34. The first segment 22a and the second segment 22b are fixed to each other by a fixing member 40 such as a bolt.

Figures 5A, 5B:
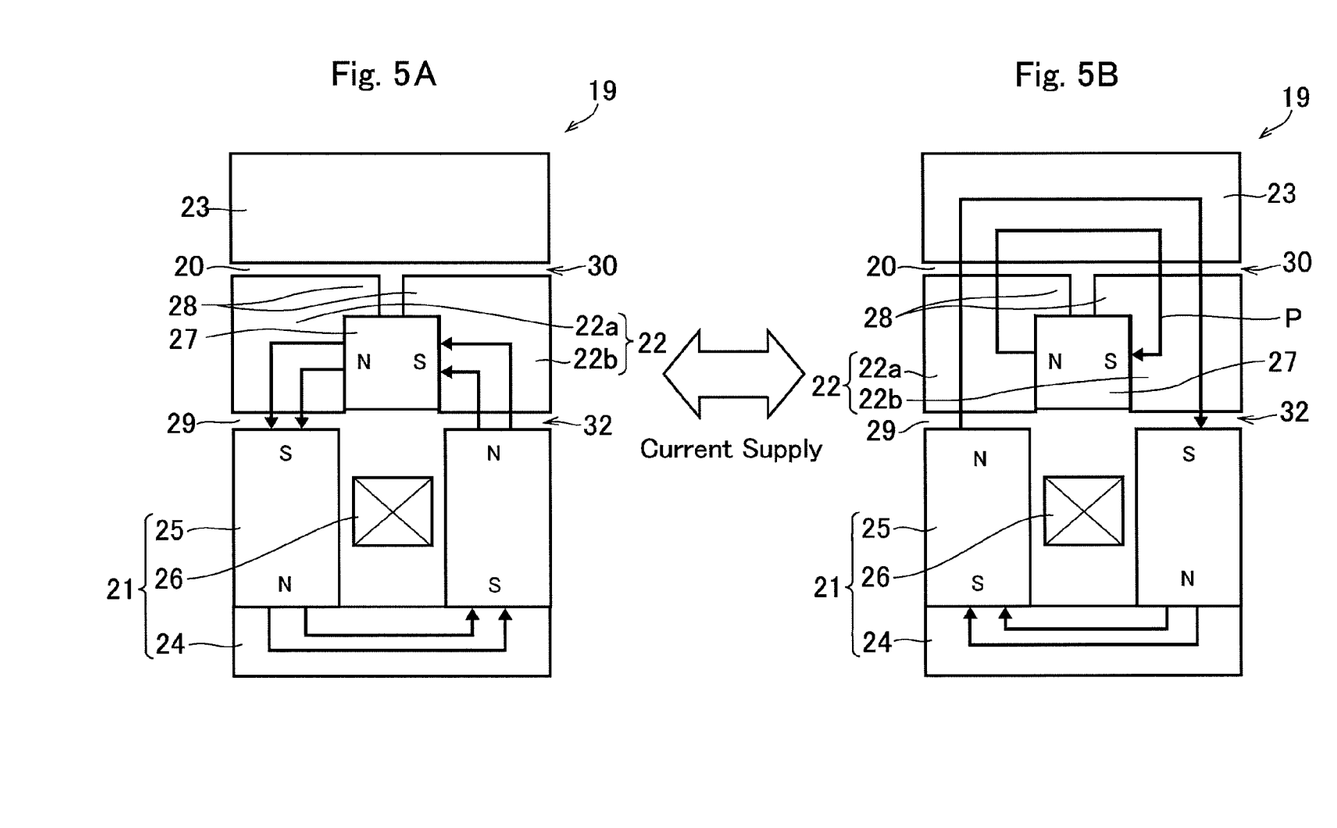

As described, in the clutch device 19, polarity of the reversible magnet 25 is reversed by energizing the coil 26 to engage the first rotary member 22 with the second rotary member 23. Turning to FIGS. 5A and 5B, there are shown magnetic fluxes in the clutch device 19 in engagement and in the clutch device 19 in disengagement. Specifically, FIG. 5A shows a situation in which the clutch device 19 is in disengagement, and in FIG. 5A, a magnetic field is indicated by arrows. As known in the art, a magnetic flux flows from the North pole toward the South pole. In the situation shown in FIG. 5A, current is not supplied to the coil 26 so that the polarities of the reversible magnets 25 are set in such a manner that the magnetic fluxes flow only between the fixed member 21 and the first rotary member 22. That is, a forward closed magnetic circuit circulating between the fixed member 21 and the first rotary member 22 is established. In the vehicle Ve shown in FIG. 1, for example, the clutch device 19 is brought into engagement when the operating mode of the vehicle Ve is switched from a single-motor mode in which the vehicle Ve is powered only by the second motor 3 while disconnecting the first motor from the powertrain, to a hybrid mode in which the vehicle Ve is powered by both of the engine 1 and the motor(s).

In this situation, polarities of the reversible magnets 25 are reversed by applying current to the coil 26 as shown in FIG. 5B so that directions of the magnet fluxes are reversed to establish a reversed closed magnetic circuit P circulating between the first rotary member 22 and the second rotary member 23, and to establish another reversed closed magnetic circuit circulating between the fixed member 21 and the second rotary member 23 via the first rotary member 22. Consequently, the first rotary member 22 and the second rotary member 23 are magnetically attracted to each other, that is, the clutch device 19 is brought into engagement. In this situation, the clutch device 19 is brought into disengagement by applying current to the coil 26 again to reverse the polarities of the reversible magnets 25 as shown in FIG. 5A.

Here will be explained advantages to be achieved by the clutch device 19 according to the embodiment. As described, the clutch device 19 is a reversible magnetic engagement device, and the first rotary member 22 and the second rotary member 23 are engaged with each other without being contacted to each other. In the clutch device 19, the reversible magnets 25 are arranged in the fixed member 21, and the non-reversible magnet 27 is arranged in the first rotary member 22. In the clutch device 19 thus structured, current may be supplied to the coil 26 through a conventional lead wire, and it is unnecessary to supply current to one of the first rotary member 22 and the second rotary member 23 using a slip ring or the like. In the clutch device 19, therefore, an engagement force of the clutch device 19 will not be reduced by an unstable contact between the slip ring and a brush. For the reason, reliability of the clutch device 19 can be improved.

As described, in the clutch device 19, the fixed member 21, the first rotary member 22, and the second rotary member 23 are arranged concentrically to one another in order from the rotational center axis O. In the clutch device 19, therefore, the radial distance R between the rotational center axis O and the air gap 20 can be increased so that the circumferential area S of the engagement portion 30 between the fixed member 21 and the second rotary member 23 is increased. That is, the torque transmitting capacity of the clutch device 19 can be increased. The circumferential area S of the engagement portion 30 is also increased to further increase the torque transmitting capacity of the clutch device 19 by the stopper portions 28 formed on the first segment 22a and the second segment 22b of the first rotary member 22.

In addition, since the fixed member 21, the first rotary member 22, and the second rotary member 23 are arranged concentrically to one another, a size of the clutch device 19 in the axial direction can be reduced. In the powertrain shown in FIG. 1, there is an available space in the radial direction and hence the clutch device 19 can be fitted easily in the powertrain shown in FIG. 1. Thus, according to the embodiment, the torque transmitting capacity of the clutch device 19 can be increased without increasing a size in the axial direction, and the clutch device 19 can be fitted easily especially into a powertrain of a vehicle in which an engine is mounted transversely.

Further, the clutch device 19 may also serve as a brake device in which one of the engagement elements is fixed. For example, the clutch device 19 adapted to serve as the brake device may be engaged when shifting the operating mode from the hybrid mode in which the vehicle Ve is powered by the engine 1 and the first motor 2 to an engine mode in which the vehicle Ve is powered only by the engine 1 while stopping the rotation of the first motor 2. In addition, the clutch device 19 adapted to serve as the brake device may also be engaged to stop the rotation of the first motor 2 when the first motor 2 has to be cooled and when the first motor 2 has to be protected.

Although the above exemplary embodiments of the present disclosure have been described, it will be understood by those skilled in the art that the present application should not be limited to the described exemplary embodiments, and various changes and modifications can be made within the scope of the present disclosure. For example, the first rotary member 22 and the second rotary member 23 may also be contacted to each other when engaged. The clutch device 19 thus modified may be suitable to be arranged transversely. In this case specifically, the fixed member 21, the first rotary member 22, and the second rotary member 23 are arranged in the axial direction.

In addition, the clutch device 19 may also be used in a vehicle having a geared transmission in which a gear stage is shifted by manipulating a clutch and a brake, or a belt-driven continuously variable transmission in which a speed ratio is varied continuously by varying an effective running diameter of a belt applied to pulleys. Further, the clutch device 19 may also be used in an electric vehicle powered by a motor, or other industrial machines for transmitting power.

What is claimed is:

1. A magnetic clutch device, that engages a first engagement element and a second engagement element with each other to transmit torque by establishing a magnetic circuit between the first engagement element and the second engagement element, and that disengages the first engagement element and the second engagement element from each other to interrupt torque transmission by eliminating the magnetic circuit between the first engagement element and the second engagement element, wherein the first engagement element and the second engagement element are arranged concentrically to each other, a fixed member that is not allowed to rotate is arranged in a radially inner side or radially outer side of the first engagement element and the second engagement element while being concentrically to the first engagement element and the second engagement element, the first engagement element includes a first magnet, the fixed member includes a second magnet in which a polarity is switched between a straight polarity and a reversed polarity in accordance with a direction of the magnetic circuit established by the first magnet between the first engagement element and the second engagement element, and a coil that switches the polarity of the second magnet depending on a direction of current applied thereto, the second engagement element is situated in radially opposite side of the fixed member across the first engagement element, and the second engagement element is formed of a magnetic body through which the magnetic circuit penetrates, and the magnetic circuit circulating between the first engagement element and the second engagement element is eliminated when the polarity of the second magnet is set in the straight polarity.

2. The magnetic clutch device as claimed in claim 1, wherein the magnetic circuit circulating between the first engagement element and the second engagement element is eliminated by the second magnet to disengage the first engagement element and the second engagement element from each other, and the magnetic circuit is established between the first engagement element and the second engagement element by the second magnet to magnetically attract the first engagement element and the second engagement element to each other.

3. The magnetic clutch device as claimed in claim 1, wherein the fixed member is situated in radially inner side of the first engagement element and the second engagement element.

4. The magnetic clutch device as claimed in claim 1, wherein the first engagement element includes an engagement face, the second engagement element includes an engagement face, and the first engagement element and the second engagement element are magnetically engaged with each other while maintaining a gap between the engagement face of the first engagement element and the engagement face of the second engagement element.

5. The magnetic clutch device as claimed in claim 4, wherein:

a plurality of protrusions are formed on the engagement face of the first engagement element in such a manner as to protrude toward the engagement face of the second engagement element, and a plurality of protrusions are formed on the engagement face of the second engagement element in such a manner as to protrude toward the engagement face of the first engagement element.

6. The magnetic clutch device as claimed in claim 1, wherein the first engagement element includes a first segment and a second segment being opposed to each other in an axial direction, the first magnet is interposed between the first segment and the second segment, and the first engagement element further includes a stopper portion formed on a radially outer portion of each of the first segment and the second segment.

7. The magnetic clutch device as claimed in claim 1, wherein the magnetic clutch device is arranged in a powertrain of a vehicle having a differential mechanism, the fixed member is fixed to a stationary member, the first engagement element is connected to a first disc member, the second engagement element is connected to a second disc member, the first disc member is connected to a rotary shaft of a first rotary element of the differential mechanism, and the second disc member is connected to a rotor shaft of a first motor.

8. The magnetic clutch device as claimed in claim 7, wherein the differential mechanism includes the first rotary element, a second rotary element, and a third rotary element the first rotary element is connected to the first motor by engaging the first engagement element and the second engagement element, the second rotary element is connected to an engine, the third rotary element is connected to an output member that delivers a drive force to a drive wheel, the vehicle comprises a second motor connected to a power transmission route between the drive wheel and the third rotary element, and the second motor is driven by an electric power generated by the first motor to generate a drive force to be delivered to the drive wheel.

* * * * *